Feb. 14, 1933.　　　V. G. APPLE　　　1,897,784
MOTOR DRIVEN PUMP
Filed Aug. 7, 1930
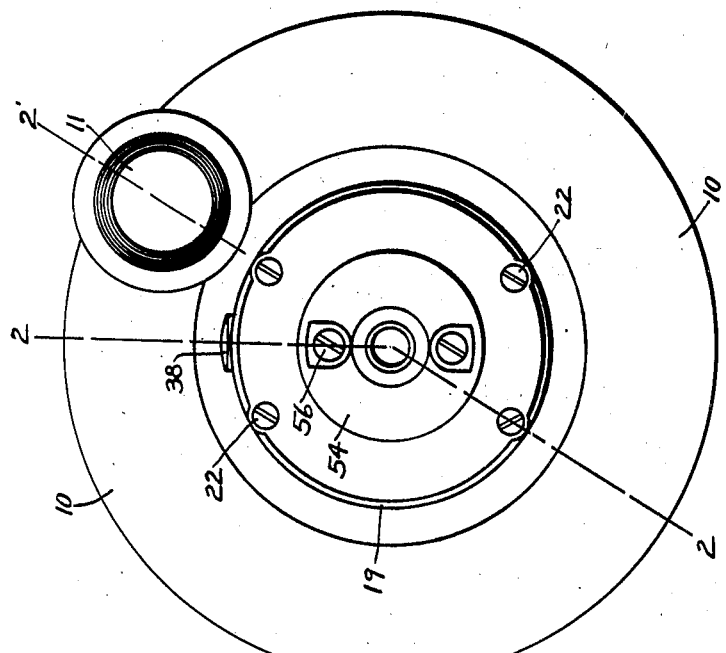
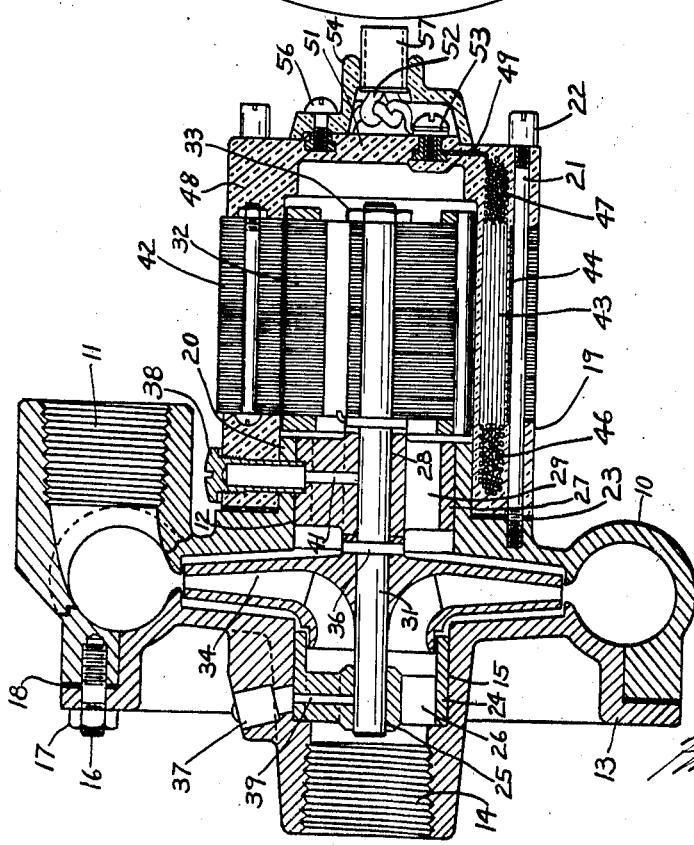
INVENTOR Patented Feb. 14, 1933

1,897,784

UNITED STATES PATENT OFFICE

VINCENT G. APPLE, OF DAYTON, OHIO; HERBERT F. APPLE, EDWARD M. APPLE, AND GOURLEY DARROCH EXECUTORS OF SAID VINCENT G. APPLE, DECEASED

MOTOR-DRIVEN PUMP

Application filed August 7, 1930. Serial No. 473,740.

This invention relates to motor-driven pumps of a kind employed for pumping a fluid under pressure and in which the operative part of the pump is within a casing and under pressure when the pump is in action.

In pumps of this type as heretofore constructed, whether the operative pumping means consists of a rotor, impeller or other mechanism, the shaft by which the operative portion is driven, necessarily extends through the casing, and, because there is pressure within the casing, it is necessary to have a packing gland around the shaft where it emerges from the casing to be joined to the motor.

The object of this invention is to eliminate this packing gland by mounting the motor housing on the pump casing in such a manner that the interior of the motor housing and the interior of the pump casing are interconnected, and then employing a motor in which the winding is imbedded and sealed in a solid wall of insulation composing the motor housing, to the end that a fluid may be pumped which is of such a nature that if admitted to the ordinary motor it would immediately destroy it yet which may pass freely from the interior of the pump to the interior of the motor in my improved design without injury thereto.

I attain this object in the structure hereinafter described and illustrated in the accompanying drawing, in which—

Fig. 1 is a top plan view of a motor driven centrifugal pump which I have selected as an embodiment of my invention; and Fig. 2 is an axial section taken at 2—2 through Fig. 1, cutting through a core slot containing a stator coil on one side and passing through between two coils on the other side, a small portion being broken farther back to the line 2'.

Similar numerals refer to similar parts throughout the several views.

The pump casing 10 has a discharge opening 11 and an axial opening 12. Casing 10 is closed on the one side by the pump cover 13, which has the suction opening 14 and the axial opening 15. Cover 13 is secured to the casing 10 by studs 16 and nuts 17. A gasket 18 makes the joint between the casing and cover pressure-tight.

The other side of the pump casing 10 is closed by the motor housing 19. Casing 10 has an integral pilot 20 extending into the interior of the motor housing to keep the pump casing and the motor housing in axial alignment. Studs 21 and nuts 22 secure the motor housing to the pump casing. A gasket 23 makes the joint between the casing and the housing pressure-tight.

In the axial openings 15 of cover 13 is a bearing member 24 comprising a central opening 25 with a plurality of spaced apart openings 26 around it. A similar but longer bearing member 27, fitted to the axial opening 12, has the central opening 28 and a plurality of spaced apart openings 29 surrounding it.

Shaft 31, which serves both as pump shaft and motor shaft, has rotative bearing in openings 25 and 28, and extends beyond bearing member 27 into the motor housing 19. The rotor 32 of the motor is secured to the shaft by the nut 33. The impeller 34 of the pump is secured to the shaft by the pin 36. Oil cups 37 and 38 provide lubrication for the shaft through oil holes 39 and 41 respectively.

The motor housing 19 comprises a laminated stator core 42 having coils 43 wound into its slots 44, the coils forming the winding heads 46 and 47 at the ends of the core. A heavy wall 48 of insulation is molded to the core 42 to extend through the unfilled portions of the slots 44 about the winding heads 46 and 47 and the coil terminals 49 and across the end as at 51 to enclose it. The coils are thus completely enclosed in a moisture-proof wall of insulation and fluid under pressure admitted to the interor of the housing can neither affect the coils nor escape from the housing. The terminals 49 extend from the coils to the outside of the housing. A line cord 52 is secured to the terminals as at 53, and a cap 54, held to the housing by screws 56, covers the line connections. The line cord is preferably encased in a lead covering 57.

Having described an embodiment of my invention in which the objects set forth are attained.

I claim,

In combination, a centrifugal pump body with axis vertical, enlarged bearing hubs at the top and bottom of said pump body, bearing members, each having a central axial opening surrounded by a circular row of other axial openings, within said enlarged hubs, the lower hub having a central pump-suction opening below its bearing member, a shaft rotatably supported in the said central axial openings and extending through and beyond the upper bearing member, a pump impeller secured to said shaft between said bearing members, an electric motor rotor secured to said shaft above the upper bearing member, and an electric motor stator in the form of an inverted cup surrounding the upper hub and secured thereto pressure-tight, said stator comprising a core having a central rotor opening, a plurality of windings slots around said central opening, coils of wire in said slots and a one-piece mass of molded insulation covering the coil heads at the ends of the core and the coil sides within the slots, leaving the core teeth between the core slots extending through the insulating mass immediately surrounding the motor rotor.

In testimony whereof I affix my signature.

VINCENT G. APPLE.